United States Patent
Soda et al.

(10) Patent No.: US 9,446,913 B2
(45) Date of Patent: Sep. 20, 2016

(54) POWDER CONVEYANCE DEVICE AND CHAR RECOVERY APPARATUS

(71) Applicant: MITSUBISHI HEAVY INDUSTRIES, LTD., Tokyo (JP)

(72) Inventors: Yasuo Soda, Tokyo (JP); Haruto Shinoda, Tokyo (JP); Yasunari Shibata, Tokyo (JP); Yoshinori Koyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/431,069

(22) PCT Filed: Sep. 17, 2013

(86) PCT No.: PCT/JP2013/075058
§ 371 (c)(1),
(2) Date: Mar. 25, 2015

(87) PCT Pub. No.: WO2014/050635
PCT Pub. Date: Apr. 3, 2014

(65) Prior Publication Data
US 2015/0239684 A1   Aug. 27, 2015

(30) Foreign Application Priority Data
Sep. 28, 2012   (JP) ................... 2012-217429

(51) Int. Cl.
B65G 53/02   (2006.01)
B65G 53/20   (2006.01)
(Continued)

(52) U.S. Cl.
CPC ............... *B65G 53/20* (2013.01); *B65G 65/32* (2013.01); *C10J 3/503* (2013.01); *C10J 3/52* (2013.01);
(Continued)

(58) Field of Classification Search
CPC .................................. B65G 53/02; C10J 3/52
USPC .......... 406/88, 89, 90, 91; 414/676; 202/261
See application file for complete search history.

(56) References Cited

U.S. PATENT DOCUMENTS

| | | | |
|---|---|---|---|
| 2,868,590 A * | 1/1959 | Allen | B65G 53/58 406/144 |
| 3,751,214 A * | 8/1973 | Wenzel | B65G 53/30 202/137 |

(Continued)

FOREIGN PATENT DOCUMENTS

| | | |
|---|---|---|
| CN | 101743383 | 6/2010 |
| JP | 54-21680 | 2/1979 |

(Continued)

OTHER PUBLICATIONS

International Search Report issued Dec. 17, 2013 in corresponding International Application No. PCT/JP2013/075058.

(Continued)

*Primary Examiner* — Joseph Dillon, Jr.
(74) *Attorney, Agent, or Firm* — Wenderoth, Lind & Ponack, L.L.P.

(57) ABSTRACT

A powder conveyance device and a char recovery apparatus are each provided with: an inclination part serving as a powder discharge line which can convey char at a predetermined tilt angle by allowing the char to fall by gravity; a first porous plate having a predetermined opening ratio and being disposed along the inclination part; a second porous plate having a higher opening ratio than the first porous plate and being disposed along the inclination part at a position above the first porous plate; and an assist gas feed device for feeding assist gas to the inclination part through both the first porous plate and the second porous plate.

7 Claims, 3 Drawing Sheets

(51) Int. Cl.
*C10J 3/50* (2006.01)
*B65G 65/32* (2006.01)
*C10J 3/52* (2006.01)

(52) U.S. Cl.
CPC ....... *C10J 2200/09* (2013.01); *C10J 2300/165* (2013.01); *C10J 2300/1606* (2013.01); *C10J 2300/1653* (2013.01); *C10J 2300/1671* (2013.01); *C10J 2300/1675* (2013.01); *C10J 2300/1678* (2013.01); *C10J 2300/1807* (2013.01); *Y02E 20/18* (2013.01)

(56) References Cited

U.S. PATENT DOCUMENTS

| | | | | |
|---|---|---|---|---|
| 4,773,796 | A * | 9/1988 | Strehlow | B65G 53/20 406/138 |
| 5,524,768 | A * | 6/1996 | de Silva | B03B 4/00 209/235 |
| 6,436,158 | B1 * | 8/2002 | Fujikawa | C10L 9/06 44/592 |
| 6,764,253 | B1 * | 7/2004 | Pfeiffer | B65G 53/521 406/11 |
| 7,144,204 | B2 * | 12/2006 | Hilgraf | B65G 53/521 406/128 |
| 7,329,071 | B2 * | 2/2008 | Sonnichsen | B65G 53/521 406/144 |
| 7,553,111 | B2 * | 6/2009 | Salmento | B65G 53/18 406/138 |
| 7,805,923 | B2 * | 10/2010 | Yoshida | F01K 23/068 60/39.12 |
| 7,810,310 | B2 * | 10/2010 | Yoshida | F02C 3/28 60/39.12 |
| 8,408,007 | B2 * | 4/2013 | Kamohara | C10J 3/723 60/39.24 |
| 8,615,981 | B2 | 12/2013 | Yamamoto et al. | |
| 2001/0032780 | A1 * | 10/2001 | Winter | B65G 33/265 202/117 |
| 2007/0137169 | A1 * | 6/2007 | Ishigami | F01K 23/067 60/39.12 |
| 2008/0134658 | A1 * | 6/2008 | Yoshida | F01K 23/068 60/39.12 |
| 2008/0141647 | A1 * | 6/2008 | Yoshida | F02C 3/28 60/39.12 |
| 2008/0295480 | A1 * | 12/2008 | Hyakutake | C10J 3/00 60/39.12 |
| 2009/0003942 | A1 * | 1/2009 | Salmento | B65G 53/20 406/89 |
| 2009/0151315 | A1 * | 6/2009 | Kamohara | C10J 3/723 60/39.24 |
| 2009/0199474 | A1 * | 8/2009 | Leininger | C10J 3/52 48/69 |
| 2010/0058730 | A1 * | 3/2010 | Sonoda | F01D 21/14 60/39.12 |
| 2010/0175364 | A1 | 7/2010 | Yamamoto et al. | |
| 2013/0140168 | A1 * | 6/2013 | Koyama | B65G 53/18 202/261 |
| 2013/0180362 | A1 * | 7/2013 | Kamikawa | C21B 11/00 75/392 |
| 2013/0319300 | A1 * | 12/2013 | Sato | F23G 5/027 110/229 |
| 2014/0231239 | A1 * | 8/2014 | Koyama | B65G 53/18 202/261 |
| 2015/0021158 | A1 * | 1/2015 | Nakagawa | C10B 47/30 202/96 |
| 2015/0175890 | A1 * | 6/2015 | Nakagawa | C10B 57/005 202/136 |

FOREIGN PATENT DOCUMENTS

| | | |
|---|---|---|
| JP | 56-126253 | 9/1981 |
| JP | 58-123825 | 8/1983 |
| JP | 60-195833 | 12/1985 |
| JP | 1-58533 | 4/1989 |
| JP | 5-330652 | 12/1993 |
| JP | 11-108742 | 4/1999 |
| JP | 2008-230825 | 10/2008 |
| JP | 2012-126571 | 7/2012 |

OTHER PUBLICATIONS

Decision of a Patent Grant issued Sep. 12, 2014 in corresponding Japanese Application No. 2012-217429 (with English translation).
Translation of Written Opinion of the International Searching Authority issued Dec. 17, 2013 in corresponding International Application No. PCT/JP2013/075058.
Notice on the First Office Action issued Oct. 19, 2015 in corresponding Chinese Application No. 201380047592.6 (with English translation).

* cited by examiner

POWDER CONVEYANCE DEVICE AND CHAR RECOVERY APPARATUS

TECHNICAL FIELD

The present invention relates to a powder conveyance device and a char recovery apparatus which are used for, for example, a bin system in a char recovery apparatus of an integrated coal gasification combined cycle or the like.

BACKGROUND ART

A integrated coal gasification combined cycle is the cycle aimed at higher efficiency and higher environmental performance compared with conventional coal-fired power generation by gasifying coal and combining it with combined cylinder power generation. The integrated coal gasification combined cycles has a great advantage that coal having a large amount of resources is also available. It is known that the advantage becomes greater by increasing applied kinds of coal.

Generally, the conventional integrated coal gasification combined cycles have a coal feed apparatus, a coal gasifier, a char recovery apparatus, gas purification equipment, gas turbine equipment, steam turbine equipment, and a heat recovery steam generator. Accordingly, coal (pulverized coal) is fed to the coal gasifier by the coal feed apparatus, a gasifying agent (air, oxygen-enriched air, oxygen, steam, or the like) is taken in, the coal is combusted and gasified in this coal gasifier, and product gas (syngas) is produced. Then, as this product gas is purified after the unburned coal (char) of the coal is removed in the char recovery apparatus, and is fed to the gas turbine equipment, the product gas is combusted to produce high-temperature high-pressure combustion gas to drive a turbine. The heat energy of the exhaust gas after driving the turbine is recovered by the heat recovery steam generator to produce steam, and the steam is fed to the steam turbine equipment to drive the turbine. Accordingly, power generation is performed. Meanwhile, the exhaust gas of which the heat energy is recovered is emitted to the atmospheric air via a chimney.

The char recovery apparatus in the above-described integrated coal gasification combined cycle removes contained char, using a plurality of stages of dust collectors, from the product gas produced by the coal gasifier. Then, the collected char is returned to the coal gasifier by a predetermined amount by the char feed device. That is, a bin system having a char conveyance device is applied herein. General bin systems have one bin (or a plurality of bins), a plurality of char discharge lines which discharge char collected by respective dust collectors to this bin, and a plurality of char feed lines which feed the char collected in the bin to a plurality of hoppers (or one hopper).

As a conventional bin system, for example, there is one described in the following PTL 1, and as a powder conveyance device, for example, there is one described in the following PTL 2.

CITATION LIST

Patent Literature

[PTL 1] JP-A-2012-126571
[PTL 2] JP-A-2008-230825

Technical Problem

In the above-described conventional powder conveyance device, a porous plate is provided in piping which constitutes an assist gas feed device or a powder discharge line which feeds inert gas along a flow direction of powder, an assist gas feed device which feeds the inert gas upward from this porous plate, and the like are provided. However, if the amount of feed of the powder fluctuates, it is insufficient to simply feed the assist gas toward the powder discharge line, and there is a concern that the powder may accumulate on the powder discharge line.

SUMMARY OF INVENTION

The invention solves the above-described problem and an object thereof is to provide a powder conveyance device and a char recovery apparatus which can efficiently and appropriately convey powder or char.

Solution to Problem

A powder conveyance device of the invention for achieving the above object includes a powder discharge line capable of conveying powder at a predetermined tilt angle by allowing the char to fall by gravity; a first porous plate which has a predetermined opening ratio and is disposed along the powder discharge line; a second porous plate which has a higher opening ratio than the first porous plate and is disposed along the powder discharge line above the first porous plate; and an assist gas feed device which is provided below the first porous plate and feeds assist gas to the powder discharge line through the first porous plate and the second porous plate.

Accordingly, when the powder is conveyed along the powder discharge line by allowing the powder to fall by gravity, the assist gas is fed to the powder discharge line through the first porous plate and the second porous plate by the assist gas feed device, whereby the powder is appropriately conveyed by the assist gas without accumulating on the powder discharge line. In this case, since the opening ratio of the upper second porous plate is higher than that of the lower first porous plate, the assist gas is fed upward at a high speed by respective holes of the first porous plate, reaches a low speed by respective holes of the second porous plate, and is diffused in a wide range of the powder discharge line. As a result, powder can be efficiently conveyed without piling on the powder discharge line.

In the powder conveyance device of the invention, the first porous plate and the second porous plate are disposed in close contact with each other.

Accordingly, as the second porous plate is brought into close contact with the first porous plate, the assist gas can be efficiently fed to the powder on the powder discharge line to perform the accumulation of the powder, without leaking out from between the first porous plate and the second porous plate.

In the powder conveyance device of the invention, the powder discharge line has piping which forms a tube shape, the first porous plate and the second porous plate are disposed inside the piping, and an assist gas chamber which constitutes the assist gas feed device is provided below the first porous plate and the second porous plate inside the piping.

Accordingly, since the piping having a tube shape constitutes the powder discharge line, the assist gas chamber is provided inside the piping, and the first porous plate and the second porous plate are disposed inside the piping, the device can be simplified and can be made compact.

In the powder conveyance device of the invention, a powder feed line capable of feeding powder is connected to a base end of the powder discharge line, and the first porous plate, the second porous plate, and the assist gas feed device are disposed at least at a connection section of the powder feed line in the powder discharge line.

Accordingly, if the amount of feed of the powder fluctuates, the powder tends to accumulate on a powder feed unit from the powder feed line in the powder discharge line. Therefore, the accumulation of the powder can be effectively prevented by disposing the first porous plate, the second porous plate, and the assist gas feed device at this position.

In the powder conveyance device of the invention, the first assist gas feed pipe capable of feeding the assist gas from the powder feed line toward the powder discharge line is provided.

Accordingly, the accumulation of the powder can be effectively prevented by feeding the assist gas from the powder feed line toward the powder discharge line with the first assist gas feed pipe.

In the powder conveyance device of the invention, the second assist gas feed pipe capable of feeding the assist gas toward a connection section of the powder feed line in the powder discharge line is provided.

Accordingly, the accumulation of the powder can be effectively prevented by feeding the assist gas toward the connection section of the powder feed line in the powder discharge line with a second assist gas feed pipe.

In the powder conveyance device of the invention, the assist gas feed pipe intermittently feeds the assist gas.

Accordingly, the accumulation of the powder can be effectively prevented by intermittently feeding the assist gas with the first assist gas feed pipe.

In the powder conveyance device of the invention, the assist gas feed pipe has a gas feed nozzle which forms a conical shape.

Accordingly, as the assist gas feed pipe feeds the assist gas in a conical shape from the gas feed nozzle, it is possible to feed the assist gas over a wide range. As a result, the accumulation of the powder can be effectively prevented.

Additionally, the char recovery apparatus of the invention is a char recovery apparatus which collects an unburned coal from a product gas produced by gasifying solid fuel. The char recovery apparatus includes a first dust collector that is coupled to a product gas line for the product gas, a second dust collector that is coupled to a first gas discharge line in the first dust collector; a bin that is coupled to a first unburned coal discharge line in the first dust collector and a second unburned coal discharge line in the second dust collector; an unburned coal recovery system which returns the unburned coal from the bin; a first porous plate which has a predetermined opening ratio and is disposed along the unburned coal discharge line; a second porous plate which has a higher opening ratio than the first porous plate and is disposed along the unburned coal discharge line above the first porous plate, and an assist gas feed device which is provided below the first porous plate and feeds assist gas to the unburned coal discharge line through the first porous plate and the second porous plate.

Accordingly, an unburned coal of coarse particles is separated from the product gas by the first dust collector, an unburned coal of fine particles is separated from the product gas by the second dust collector, the unburned coals are stored in the bin through the respective unburned coal discharge lines, and the unburned coals stored in the bin are returned to the unburned coal recovery system. Accordingly, when the powder is conveyed along the unburned coal discharge line by allowing the powder to fall by gravity, the assist gas is fed to the unburned coal discharge line through the first porous plate and the second porous plate by the assist gas feed device, whereby the powder is appropriately conveyed by the assist gas without piling on the unburned coal discharge line. In this case, since the opening ratio of the upper second porous plate is higher than that of the lower first porous plate, the assist gas is fed upward at a high speed by respective holes of the first porous plate, reaches a low speed by respective holes of the second porous plate, and is diffused in a wide range of the unburned coal discharge line. As a result, powder can be efficiently conveyed without piling on the unburned coal discharge line.

Advantageous Effects of Invention

According to the powder conveyance device and the char recovery apparatus of the invention, the first porous plate having a predetermined opening ratio is provided on the powder discharge line (unburned coal discharge line), the second porous plate having a high opening ratio is provided on the first porous plate, and the assist gas feed device which feeds the assist gas through the respective porous plates is provided. Thus, the powder (char) can be efficiently conveyed without piling on the powder discharge line (unburned coal discharge line).

DESCRIPTION OF EMBODIMENTS

Hereinafter, preferable examples of a powder conveyance device and a char recovery apparatus related to the invention will be described in detail with reference to the accompanying drawings. In addition, the invention is not limited by the examples and includes those configured by combining respective examples when there are a plurality of examples.

Examples

Figure 1:
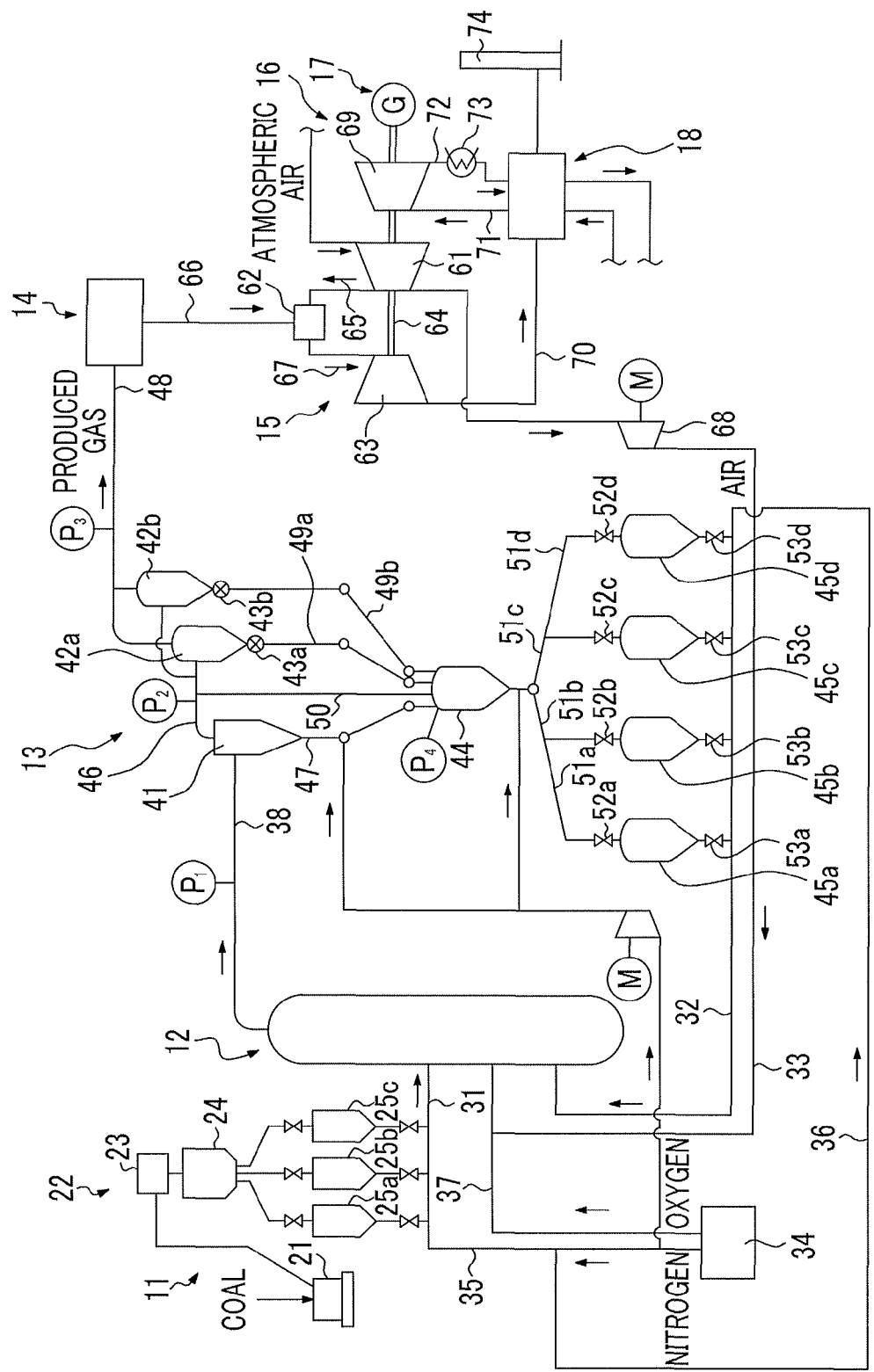
FIG. 1 is a schematic configuration diagram of an integrated coal gasification combined cycle to which a powder conveyance device related to an example of the invention is applied.
Figure 2:
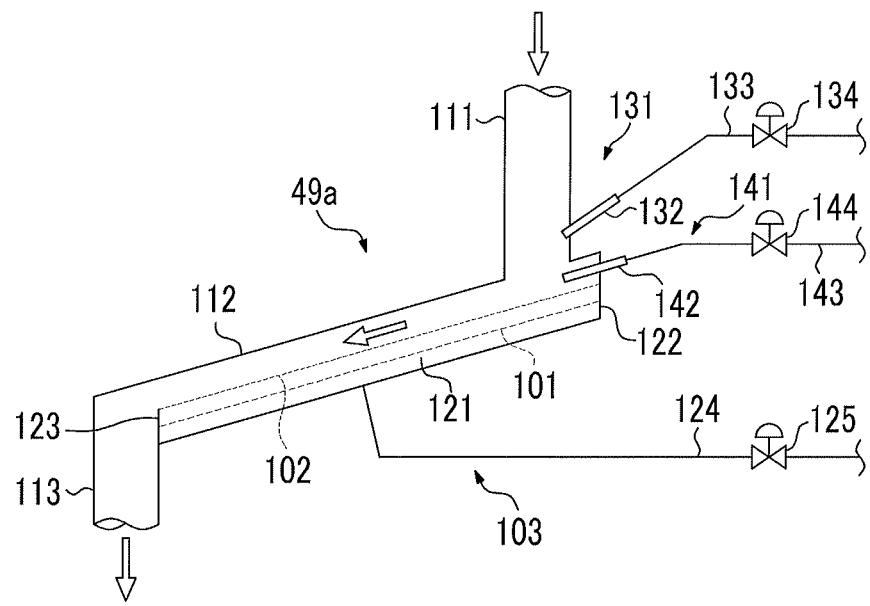
FIG. 2 is a schematic view illustrating the powder conveyance device of the present example.
Figure 3:
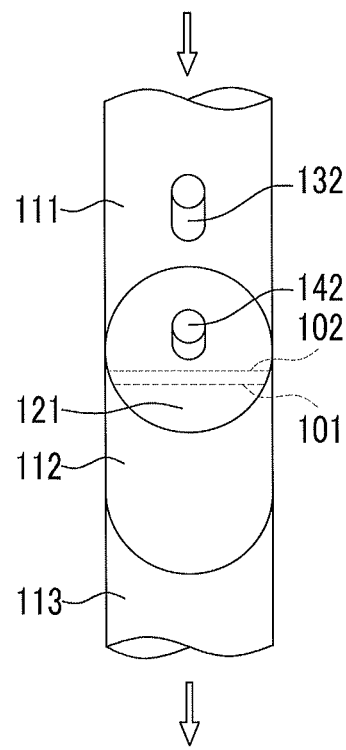
FIG. 3 is a side view illustrating the powder conveyance device of the present example.
Figure 4:
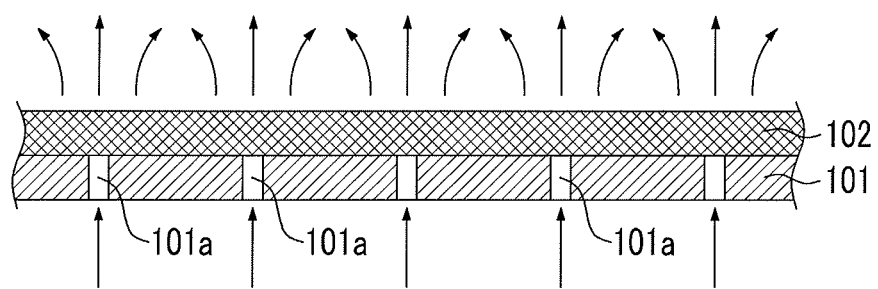
FIG. 4 is a cross-sectional view illustrating a porous plate in the powder conveyance device of the present example.
Figure 5:
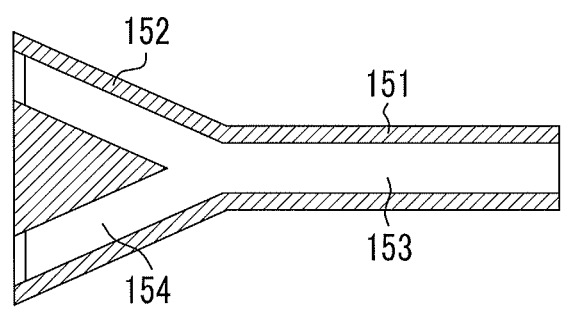
FIG. 5 is a cross-sectional view illustrating a modification example of a gas feed nozzle in the powder conveyance device of the present example.

FIG. 1 is a schematic configuration diagram of an integrated coal gasification combined cycle to which a powder conveyance device related to an example of the invention is applied, FIG. 2 is a schematic view illustrating the powder conveyance device of the present example, FIG. 3 is a side view of the powder conveyance device of the present example, FIG. 4 is a cross-sectional view illustrating a porous plate in the powder conveyance device of the present example, and FIG. 5 is a cross-sectional view illustrating a modification example of a gas feed nozzle in the powder conveyance device of the present example.

The integrated coal gasification combined cycle (IGCC) of the present example adopts an air blow-up system which produces syngas with a gasifier, using air as an oxidizer, and feeds syngas after purification in gas purification equipment to gas turbine equipment as fuel gas, thereby performing electric power generation. That is, the integrated coal gasification combined cycle of the present example is air blow-up type power generation equipment.

The integrated coal gasification combined cycle of the present example, as illustrated in FIG. 1, has a coal feed apparatus 11, a coal gasifier 12, a char recovery apparatus 13, gas purification equipment 14, gas turbine equipment 15, steam turbine equipment 16, a generator 17, and a heat recovery steam generator (HRSG) 18.

The coal feed apparatus 11 has a coal mill (mill) 21, and a pulverized coal feed apparatus 22 which pressurizes and feed the pulverized coal dried and finely pulverized by the coal mill 21. The coal mill 21 produces pulverized coal by pulverizing coal in the shape of fine particles while drying the coal with drying gas. In this case, a portion of the exhaust gas from the gas turbine equipment 15 or the heat recovery steam generator 18 is used as the drying gas. Also, a pulverized coal separating apparatus (for example, dust collector) 23, a pulverized coal bin 24, and a plurality of pulverized coal feed hoppers 25a, 25b, and 25c are provided as the pulverized coal feed apparatus 22 on the downstream side of the coal mill 21.

The coal gasifier 12 has a coal feed line 31 connected thereto from the pulverized coal feed apparatus 22, and is adapted to enable the pulverized coal to be fed thereto. Additionally, the coal gasifier 12 has a char recovery system 32 connected thereto from the char recovery apparatus 13, and is adapted to enable the char (an unburned coal of coal, or powder) collected by the char recovery apparatus 13 to be recycled thereto.

Moreover, the coal gasifier 12 has a compressed air feed line 33 connected thereto from the gas turbine equipment 15 (compressor 61), and is adapted to a portion of air compressed by the gas turbine equipment 15 to be raised in pressure by a bleed air booster and fed thereto. An air separation apparatus 34 separates and produces nitrogen and oxygen from the atmospheric air, and has a first nitrogen feed line 35 connected to the coal feed line 31, has a second nitrogen feed line 36 connected to the char recovery system 32, and has an oxygen feed line 37 connected to the compressed air feed line 33. In this case, nitrogen is used as a coal or char carrying gas, and oxygen is used as a gasifying agent.

The coal gasifier 12 has, for example, an entrained bed type gasifier, and partially oxidizes and gasifies coal (pulverized coal) fed into the interior thereof, using gasifying agents (air, oxygen-enriched air, oxygen, steam, and the like), thereby generating combustible gas (product gas or syngas) having carbon dioxide or hydrogen as a main component. In addition, the coal gasifier 12 may be a fluidized bed gasifier or a fixed bed gasifier without being limited to the entrained bed gasifier. Also, a product gas line 38 is provided downstream of the coal gasifier 12 and is connected to the char recovery apparatus 13. The char contained in product gas by this char recovery apparatus 13 and the product gas are separable from each other. In this case, the combustible gas may be fed to the char recovery apparatus 13 through the product gas line 38 after being cooled to a predetermined temperature by providing a gas cooling system downstream of the gasifier.

The powder conveyance device of the invention is applied to the char recovery apparatus 13 which has a cyclone 41 serving as a first dust collector, a first filter 42a and a second filter 42b as a second dust collector, respective rotary valves 43a and 43b, a bin 44, and hoppers 45a, 45b, 45c, and 45d. The cyclone 41 primarily separates (separates coarse particles) the char contained in the combustible gas produced by the coal gasifier 12. A first gas discharge line 46 that discharges the combustible gas from which the coarse particle char is separated is connected to an upper section of the cyclone, and a first char discharge line (first unburned coal discharge line) 47 that discharges the coarse particle char separated from the combustible gas is connected to a lower section of the cyclone.

A first gas discharge line 46 is branched from and is respectively connected to side sections of the first and second filters 42a and 42b, a second gas discharge line 48 which discharges the combustible gas from which fine particle char is separated is connected to upper sections of the first and second filters, and second char discharge lines (second unburned coal discharge lines) 49a and 49b which discharge the fine particle char separated from the combustible gas are connected to lower sections of the first and second filters. Rotary valves 43a and 43b are respectively provided at discharge sections of the respective filters 42a and 42b to the second char discharge lines 49a and 49b. The filters 42a and 42b are porous filters, have a filter material made of, for example, ceramics, and are adapted to be capable of removing the char in the combustible gas when the combustible gas passes through the filter material. Also, the char trapped with these filters 42a and 42b falls by reverse-washing processing or the like, is discharged from a filter vessel by the rotary valves 43a and 43b, and is delivered to a bin 44 through the second char discharge lines 49a and 49b.

Also, a first pressure equalizing line 50 that equalizes the pressures of the first gas discharge line 46 and the first bin 44 is provided between both the first gas discharge line and the first bin.

The bin 44 has downstream ends of the first char discharge line 47 and the second char discharge lines 49a and 49b connected thereto, and distributes the coarse particle char and the fine particle char, which are separated from the combustible gas by the cyclone 41 and the first and second filters 42a and 42b after being collected. The respective hoppers 45a, 45b, 45c, and 45d are connected to switching lines 51a, 51b, 51c, and 51d via a bin 44. In the switching lines 51a, 51b, 51c, and 51d, first switching valves 52a, 52b, 52c, and 52d are mounted on upstream sides of the hoppers 45a, 45b, 45c, and 45d, and second switching valves 53a, 53b, 53c, and 53d are mounted on downstream sides of the hoppers.

That is, a continuous operation can be performed by switching the switching lines 51a, 51b, 51c, and 51d to be used by the respective switching valves 52a, 52b, 52c, 52d, 53a, 53b, 53c, and 53d, thereby alternately using the hoppers 45a, 45b, 45c, and 45d. Also, the respective switching lines 51a, 51b, 51c, and 51d are merged together on the downstream sides of the hoppers 45a, 45b, 45c, and 45d, and are connected to the char recovery system 32. In this case, in the present example, the bin 44 is disposed for the four switching lines 51a, 51b, 51c, and 51d (four hoppers 45a, 45b, 45c, and 45d) on the upstream sides thereof, and the bin 44 is provided to collect the char, temporarily store the char, and distribute the char the respective hoppers 45a, 45b, 45c, and 45d.

In addition, pressure equalizing lines (not illustrated), which terminate a state where the char is fed to the gasifier (for example, in the case of the hopper 45a, a state where the switching valve 52a is closed, a state where the first switching valve 53a is opened, and a state where the pressure of the hopper 45a is higher than the bin 44) and which reduce the pressure of the gas in the hopper 45a and evacuate the gas to equalize the pressure of the gas in order to receive the char of the bin 44, are provided between the first gas discharge line 46 and the first hoppers 45a, 45b, 45c, and 45d of the cyclone 41.

In this way, the char recovery apparatus 13 of the present example is constituted of the cyclone 41, the first char discharge line 47, the first filter 42a and the second filter 42b, the second char discharge lines 49a and 49b, the rotary valves 43a and 43b, the bin 44, the hoppers 45a, 45b, 45c, and 45d, the char recovery system 32, and the like. Also, the powder conveyance device of the present example is applied to the char recovery apparatus 13, and is provided, for example, at the second char discharge line 49a which delivers the char trapped by the first filter 42a to the bin 44.

However, the powder conveyance device of the invention can also be applied to, for example, the second char discharge line 49b, the first char discharge line 47, the switching lines 51a, 51b, 51c, and 51d, or the like without being limited to the second char discharge line 49a.

The powder conveyance device of the present example, as illustrated in FIGS. 2 to 4, is constituted of the second char discharge line (powder discharge line) 49a which can convey char (powder) at a predetermined tilt angle by allowing the char to fall by gravity, a first porous plate 101 which has a predetermined opening ratio and is disposed along the second char discharge line 49a, a second porous plate 102 which has an opening ratio higher than the first porous plate 101 and is disposed above the first porous plate 101 along the second char discharge line 49a, and an assist gas feed device 103 which is provided below the first porous plate 101 and feeds assist gas to the second char discharge line 49a through the first porous plate 101 and the second porous plate 102.

That is, the second char discharge line 49a has a linear part (powder feed line) 111, an inclination part 112, and a linear part 113 which form a cylindrical shape (or an angular tubular shape, a semicircular shape, or the like). The inclination part 112 is disposed so as to tilt at a predetermined angle downward from a base end to a tip, the linear part 111 which can feed the char is connected to a base end upper section of the inclination part, and the linear part 113 which can discharge the char is connected to a tip lower section of the inclination part. In this case, although the linear part 111 and the linear part 113 are disposed in the vertical direction, the piping may tilt at a larger angle than the inclination part 112.

The first porous plate 101 and the second porous plate 102 overlap each other inside the inclination part 112. Also, the first porous plate 101 is disposed on a lower side, the second porous plate 102 is disposed on an upper side, and the second porous plate 102 is set to have a higher opening ratio than the first porous plate 101. In this case, the first porous plate 101 is made of, for example, punching metal in which a stainless steel plate is formed with a number of holes 101a, and the second porous plate 102 is made of, for example, a stainless steel wire net. The first porous plate 101 and the second porous plate 102 are disposed in close contact with each other without a gap.

In the assist gas feed device 103, an assist gas chamber 121 is provided below the first porous plate 101 and the second porous plate 102 inside the inclination part 112. The assist gas chamber 121 is partitioned off by a lower section of the inclination part 112, a vertical wall 122 fixed to a base end side of the inclination part 112, and a partition plate 123 fixed to a tip side of the inclination part 112, and the first porous plate 101 is disposed above the assist gas chamber. Additionally, the assist gas chamber 121 has an assist gas feed line 124 connected to a lower section thereof, and an opening and closing valve 125 is mounted on the assist gas feed line 124. The assist gas feed line 124 can feed the assist gas (inert gas) to the assist gas chamber 121.

Additionally, a first assist gas feed pipe 131 which can feed the assist gas (inert gas) is provided from the linear part 111 toward the inclination part 112. The first assist gas feed pipe 131 is constituted of a gas feed nozzle 132 which is mounted on the linear part 111, a gas feed line 133 which feeds the assist gas to the gas feed nozzle 132, and an opening and closing valve 134 which is mounted on the gas feed line 133.

Moreover, a second assist gas feed pipe 141 which can feed the assist gas (inert gas) is provided toward a connection section of the linear part 111 in the inclination part 112. The second assist gas feed pipe 141 is constituted of a gas feed nozzle 142 which is mounted on the vertical wall 122 of the inclination part 112, a gas feed line 143 which feeds the assist gas to the gas feed nozzle 142, and an opening and closing valve 144 which is mounted on the gas feed line 143.

In this case, although nitrogen gas or carbon dioxide gas is desirable as the inert gas to be used in the assist gas feed device 103, the first assist gas feed pipe 131, and the second assist gas feed pipe 141, the inert gas may be inert gas (inert gas) having oxygen concentration of 3% or less or combustible gas (obtained by increasing the pressure of outlet gas of the char recovery apparatus or outlet gas of the gas purification equipment and recycling the pressure-increased outlet gas), and this inert gas can prevent combustion of the gas which flows through the second char discharge line 49a. Additionally, it is desirable that the inert gas is gas having a temperature equal to or higher than the dew point of the gas which flows through the second char discharge line 49a. Also, the first assist gas feed pipe 131 and the second assist gas feed pipe 141 continuously or intermittently feed the inert gas.

In addition, in the present example, the first porous plate 101, the second porous plate 102, and the assist gas feed device 103 are provided over the whole region of the inclination part 112. However, the first porous plate 101, the second porous plate 102, and the assist gas feed device 103 may be provided only at the connection section of the linear part 111 in the inclination part 112 on which char tends to accumulate, that is, an upstream section in the inclination part 112.

Additionally, in the present example, the gas feed nozzles 132 and 142 linearly feed the assist gas. However, the invention is not limited to this configuration. For example, as illustrated in FIG. 5, a wide angle portion 152 may be provided at the tip of the gas feed nozzle 151, and a gas feed nozzle 154 which forms a conical shape may be formed at the wide angle portion 152 so as to communicate with the gas flow hole 153. In the gas feed nozzle 151, as an assist gas stream which forms a conical shape is fed from the gas feed nozzle 154, the accumulation state of the char fed from the linear part 111 to the inclination part 112 can be appropriately broken down and can be conveyed.

Accordingly, the char flows down into the inclination part 112 from the linear part 111 by allowing the char to fall by gravity, and is fed onto the second porous plate 102. In this case, the assist gas is fed to the assist gas chamber 121 by the assist gas feed device 103, and is fed upward through the first porous plate 101 and the second porous plate 102. Then, the assist gas is fed to the char which flows on the second porous plate 102. In this case, this assist gas can break down the char in the accumulation state, and enter between the second porous plate 102 and the char to reduce frictional resistance. As a result, the conveyance flow of the char in the inclination part 112 can be promoted, and the accumulation of the char can be suppressed.

Specifically, the opening ratio of the second porous plate 102 is made higher than that of the lower first porous plate 101. Therefore, the assist gas of the assist gas chamber 121 first reaches the second porous plate 102 through the respective holes 101a of the first porous plate 101. In this case, the assist gas is delivered to the second porous plate 102 in a state after the flow velocity thereof becomes high by passing through the respective holes 101a. Next, the high-speed assist gas which has passed through the first porous plate 101 is fed so as to be diffused by the second porous plate 102. Therefore, the assist gas diffused by the second porous plate 102 uniformly acts on the char which moves on the second porous plate 102. As a result, the assist gas can be efficiently conveyed without making the char accumulate on the second porous plate 102.

Additionally, the gas feed nozzle 132 in the first assist gas feed pipe 131 feeds the assist gas from the linear part 111 toward the inclination part 112. Therefore, since the assist gas is fed toward the char fed onto the second porous plate 102 of the base end in the inclination part 112, the flow of the char which moves on the second porous plate 102 can be promoted, and the accumulation of the char can be suppressed.

Moreover, the gas feed nozzle 142 in the second assist gas feed pipe 141 feeds the assist gas toward the connection section of the linear part 111 in the inclination part 112. Therefore, since the assist gas is fed toward the char flowing on the second porous plate 102 of the inclination part 112, the flow of the char which flows on the second porous plate 102 can be promoted, and the accumulation of the char can be suppressed.

The gas purification equipment 14 removes impurities, such as a sulfur compound, a nitrogen compound, or halide, from the gasification gas from which the char is separated by the char recovery apparatus 13, thereby performing gas purification. Then, the gas purification equipment 14 removes impurities from the gasification gas to produce fuel gas and feed this fuel gas to the gas turbine equipment 15.

The gas turbine equipment 15 has the compressor 61, a combustor 62, and a turbine 63, and the compressor 61 and the turbine 63 are coupled by a rotating shaft 64. The combustor 62 has compressed air 65 fed thereto from the compressor 61, has fuel gas 66 fed thereto from the gas purification equipment 14, and feeds combustion gas 67 to the turbine 63. Additionally, the gas turbine equipment 15 is provided with the compressed air feed line which extends from the compressor 61 to the coal gasifier 12, and a booster 68 is provided at a halfway portion of the compressed air feed line. Accordingly, the generator 17 can be driven by mixing and combusting the compressed air 65 fed from the compressor 61 and the fuel gas 66 fed from the gas purification equipment 14, in the combustor 62, and by rotating the rotating shaft 64 with the generated combustion gas 67, in the turbine 63.

The steam turbine equipment 16 has a turbine 69 coupled to the rotating shaft 64 in the gas turbine equipment 15, and the generator 17 is coupled to a base end of the rotating shaft 64. The heat recovery steam generator 18 is provided at an exhaust gas line 70 from the gas turbine equipment 15 (turbine 63), and performs heat exchange with high-temperature exhaust gas, thereby producing steam. Therefore, a steam feed line 71 and a steam recovery line 72 are provided between the heat recovery steam generator 18 and the turbine 69 of the steam turbine equipment 16, and a condenser 73 is provided at the steam recovery line 72. Accordingly, in the steam turbine equipment 16, the turbine 69 can be driven by the steam fed from the heat recovery steam generator 18, and the generator 17 can be driven by rotating the rotating shaft 64. Then, the exhaust gas from which heat is recovered by the heat recovery steam generator 18 is emitted to atmospheric air from a chimney 74.

Here, the operation of the integrated coal gasification combined cycle of the present example will be described.

In the integrated coal gasification combined cycle of the present example, as illustrated in FIG. 1, in the coal feed apparatus 11, coal is dried and pulverized by the coal mill 21 to produce pulverized coal. This pulverized coal is pressurized by the pulverized coal feed apparatus 22 constituted of the pulverized coal separating apparatus 23 and the pulverized coal bin 24, and is fed to the coal gasifier 12 through the coal feed line 31 by the nitrogen fed from the air separation apparatus 34. Additionally, the char collected by the char recovery apparatus 13 to be described below is fed to the coal gasifier 12 through the char recovery system 32 by the nitrogen fed from the air separation apparatus 34. Moreover, after the compressed air bled from the gas turbine equipment 15 to be described below is raised in pressure by the booster 68, the compressed air is fed to the coal gasifier 12 through the compressed air feed line together with the oxygen fed from the air separation apparatus 34.

In the coal gasifier 12, as the fed pulverized coal is partially oxidized and gasified by a gasifying agent (compressed air, oxygen, or the like), combustible gas (product gas or coal gas) having carbon dioxide or hydrogen as a main component is produced. Then, this combustible gas is discharged through the production gas line 38 from the coal gasifier 12, and is delivered to the char recovery apparatus 13.

In the char recovery apparatus 13, the combustible gas is first fed to the cyclone 41 where the char contained in this gas is primarily separated (coarse particles are separated) from the combustible gas. Then, the combustible gas from which the char is primarily separated is discharged to the first gas discharge line 46, the coarse particle char separated from combustible gas is delivered to the bin 44 through the first char discharge line 47.

The combustible gas from which the char is primarily separated by the cyclone 41 and which is discharged to the first gas discharge line 46 is next fed to the respective filters 42a and 42b, and the char which remains in the combustible gas is secondarily separated. Then, while the combustible gas from which the remaining char is separated is discharged to the second gas discharge line 48, the char separated from the combustible gas is discharged from the filter vessel by the rotary valves 43a and 43b, and is delivered to the bin 44 through the second char discharge lines 49a and 49b. Here, the primarily separated char delivered to the bin 44 through the first char discharge line 47 and the secondarily separated char delivered to the bin 44 through the second char discharge lines 49a and 49b can be collected in the bin 44, and the collected char can be separated and fed to the respective hoppers 45a, 45b, 45c, and 45d or stored therein.

In this case, if the pressure of the product gas line 38 is defined as $P_1$, the pressure of the first gas discharge line 46 is defined as $P_2$, and the pressure of the second gas discharge line 48 is defined as $P_3$, the relationship between the pressure becomes $P_1 > P_2 > P_3$. Additionally, as the first pressure equalizing line 50 is provided between the first gas discharge line 46 and the first bin 44, the pressure $P_2$ of the first gas discharge line 46 and the pressure $P_4$ of the bin 44 have the substantially equal pressure, and the relationship between the pressures becomes $P_1 > P_4 \cong P_2 > P_3$. Therefore, the primarily separated char separated by the cyclone 41 is delivered from the first char discharge line 47 to the bin 44. As a result, a back flow of the gas containing the coarse particle char in the first char discharge line 47 is prevented, and the dust collection efficiency of the cyclone 41 is kept high. If there is no first pressure equalizing line 50, the gas which is replaced with the volume of the primarily separated char flow back through the first char discharge line 47, and if the amount of discharge of the primarily separated char increases, a phenomenon where the primarily separated char is blown up in the discharge section (throat portion) of the cyclone occurs, and the dust collection efficiency in the cyclone 41 declines.

In addition, although the pressure $P_2$ of the first gas discharge line 46 and the pressure $P_4$ of the bin 44 are adjusted to the substantially equal pressure by the first pressure equalizing line 50, the char is delivered from the cyclone 41 and the filters 42a and 42b through the respective char discharge lines 47, 49a, and 49b to the bin 44. Therefore, the gas containing the char in the bin 44 may be emitted to the first gas discharge line 46 through the first pressure equalizing line 50. However, as the discharge gas from the first pressure equalizing line 50 is fed to the respective filters 42a and 42b, the char is separated from the combustible gas.

Additionally, the primarily separated char separated from the combustible gas by the cyclone 41 is delivered to the bin 44 through the first char discharge line 47, and the secondarily separated char separated from the combustible gas by the respective filters 42a and 42b is delivered to the bin 44 through the second char discharge lines 49a and 49b. When the secondarily separated char separated from the combustible gas by the filters 42a and 42b is delivered from the second char discharge lines 49a and 49b to the bin 44, the flow of the coarse particle char which moves along a lower surface inside the piping can be promoted by the feed of the assist gas to the second char discharge lines 49a and 49b, and the accumulation of the char into the piping can be suppressed.

That is, as illustrated in FIGS. 1 and 2, with the second char discharge line 49a, the char flows down into the inclination part 112 from the linear part 111 by allowing the char to fall by gravity, and is fed onto the second porous plate 102. In this case, the assist gas of the assist gas chamber 121 is fed upward through the first porous plate 101 and the second porous plate 102, and this assist gas acts on the char into which flows on the second porous plate 102. Then, this assist gas can break down the char in the accumulation state, and enter between the second porous plate 102 and the char to reduce frictional resistance. As a result, the conveyance flow of the char in the inclination part 112 can be promoted, and the accumulation of the char can be suppressed.

Additionally, the gas feed nozzle 132 in the first assist gas feed pipe 131 feeds the assist gas from the linear part 111 toward the inclination part 112. Therefore, since the assist gas is fed toward the char fed onto the second porous plate 102 of the base end in the inclination part 112, the flow of the char which moves on the second porous plate 102 is promoted. Moreover, the gas feed nozzle 142 in the second assist gas feed pipe 141 feeds the assist gas toward the connection section of the linear part 111 in the inclination part 112. Therefore, since the assist gas is fed toward the char flowing on the second porous plate 102 of the inclination part 112, the flow of the char which flows on the second porous plate 102 is promoted.

Also, with respect to the char collected or stored in the bin 44, the switching line 51a and the hopper 45a, the switching line 51b and the hopper 45b, the switching line 51c and the hopper 45c, and the switching line 51d and the hopper 45d are used in order by sequentially opening and closing the first switching valves 52a, 52b, 52c, and 52d and the second switching valves 53a, 53b, 53c, and 53d. Accordingly, the discharge/feed work of the collected char from the bin 44 to the hoppers 45a, 45b, 45c, and 45d can be continuously performed, and continuous operation of the char recovery apparatus 13 becomes possible. The char fed to the hoppers 45a, 45b, 45c, and 45d is returned to the coal gasifier 12 through the char recovery system 32 and is gasified.

Impurities, such as a sulfur compound, a nitrogen compound, or halide, are removed from the combustible gas from which the char is separated by the char recovery apparatus 13 in the gas purification equipment 14, and fuel gas is produced. Then, in the gas turbine equipment 15, the compressor 61 compresses air to feed the compressed air to the combustor 62, the combustor 62 mixes and combusts the compressed air fed from the compressor 61 and the fuel gas fed from the gas purification equipment 14, thereby producing combustion gas, and the turbine 63 is driven by this combustion gas, so that the generator 17 can be driven via the rotating shaft 64 to perform power generation.

Then, the exhaust gas discharged from the turbine 63 in the gas turbine equipment 15 perform heat exchange in the heat recovery steam generator 18 to produce steam, and this produced steam is fed to the steam turbine equipment 16. In the steam turbine equipment 16, the generator 17 can be driven via the rotating shaft 64 to perform power generation by driving the turbine 69 with the steam fed from the heat recovery steam generator 18. Thereafter, the exhaust gas discharged from the heat recovery steam generator 18 is emitted to the atmospheric air from the chimney 74.

In this way, the powder conveyance device of the present example is provided with the inclination part 112 serving as a powder discharge line which can convey char at a predetermined tilt angle by allowing the char to fall by gravity, the first porous plate 101 which has a predetermined opening ratio and is disposed along the inclination part 112, the second porous plate 102 which has an opening ratio higher than the first porous plate 101 and is disposed above the first porous plate 101 along the inclination part 112, and the assist gas feed device 103 which feeds assist gas to the inclination part 112 through the first porous plate 101 and the second porous plate 102.

Accordingly, when the char is conveyed along the inclination part 112 by allowing the char to fall by gravity, the assist gas is fed through the first porous plate 101 and the second porous plate 102 by the assist gas feed device 103, whereby the char is appropriately conveyed by the assist gas without accumulating on the second porous plate 102 of the inclination part 112. In this case, since the opening ratio of the upper second porous plate 102 is higher than that of the lower first porous plate 101, the assist gas is fed upward at a high speed by the respective holes 101a of the first porous plate 101, reaches a low speed by the second porous plate 102, and is broadly diffused. As a result, powder can be efficiently conveyed without piling in the inclination part 112.

In the powder conveyance device of the present example, the first porous plate 101 and the second porous plate 102 are disposed in close contact with each other. Accordingly, as the second porous plate 102 is brought into close contact with the first porous plate 101, the assist gas fed from below is appropriately guided to the char on the second porous plate 102 without leaking out of between the first porous plate 101 and the second porous plate 102. As a result, accumulation of the char can be prevented.

In the powder conveyance device of the present example, the first porous plate 101 and the second porous plate 102 are disposed inside the inclination part 112 which forms a tube shape, and the assist gas chamber 121 is provided below the first porous plate 101 and the second porous plate 102 inside the inclination part 112. Accordingly, by providing the first porous plate 101, the second porous plate 102, and the assist gas chamber 121 in a set in the inclination part 112, the device can be simplified and can be made compact.

In the powder conveyance device of the present example, the linear part 111 which can feed the char is connected to the base end of the inclination part 112, and the first porous plate 101, the second porous plate 102, and the assist gas chamber 121 are disposed to at least the connection section of the linear part 111 in the inclination part 112. If the amount of feed of the char fluctuates, the char tends to accumulate on the connection section between the linear part 111 and the inclination part 112. Therefore, the accumulation of the char can be effectively prevented by disposing the first porous plate 101, the second porous plate 102, and the assist gas feed device 103 at this position.

The powder conveyance device of the present example is provided with the first assist gas feed pipe 131 which can feed the assist gas toward the inclination part 112 from the linear part 111. Accordingly, the accumulation of the char fed to the inclination part 112 can be effectively prevented by feeding the assist gas from the linear part 111 toward the inclination part 112.

The powder conveyance device of the present example is provided with the second assist gas feed pipe 141 which can feed the assist gas toward the connection section of the linear part 111 in the inclination part 112. Accordingly, the accumulation of the char fed to the inclination part 112 can be effectively prevented.

In the powder conveyance device of the present example, the assist gas feed pipes 131 and 141 intermittently feeds the assist gas. Accordingly, the accumulation of the char can be effectively broken down by the intermittently fed assist gas and the accumulation thereof can be appropriately prevented.

In the powder conveyance device of the present example, the gas feed nozzle 154 which forms a conical shape is formed at the tip of the gas feed nozzle 151 of the assist gas feed pipe 131 or 141. Accordingly, it is possible to feed a gas stream which forms a conical shape, from the gas feed nozzle 154 of the gas feed nozzle 151, thereby feeding the assist gas over a wide range. As a result, the accumulation of the char can be effectively prevented.

Additionally, the char recovery apparatus of the present example is configured by coupling the cyclone 41 to the product gas line 38 which discharges the combustible gas from the coal gasifier 12, coupling the filters 42a and 42b to the first gas discharge line 46 in the cyclone 41, coupling the bin 44 to the first char discharge line 47 in the cyclone 41 and the second char discharge lines 49a and 49b in the filters 42a and 42b, and coupling the char recovery system 32 to the bin 44 via the hoppers 45a, 45b, 45c, and 45d. The char discharge lines 47, 49a, and 49b are provided with the first porous plate 101 which has a predetermined opening ratio and is disposed along the inclination part 112, the second porous plate 102 which has an opening ratio higher than the first porous plate 101 and is disposed above the first porous plate 101 along the inclination part 112, and the assist gas feed device 103 which feeds the assist gas to the inclination part 112 through the first porous plate 101 and the second porous plate 102.

Accordingly, the coarse particle char is separated from the product gas by the cyclone 41, the fine particle char is separated from the product gas by the filters 42a and 42b, and these types of char are stored in the bin 44 through the char discharge lines 47, 49a, and 49b. In this case, when the char is conveyed along the inclination part 112 by allowing the char to fall by gravity, the assist gas is fed through the first porous plate 101 and the second porous plate 102 by the assist gas feed device 103, whereby the char is appropriately conveyed by the assist gas without accumulating on the second porous plate 102 of the inclination part 112. In this case, since the opening ratio of the upper second porous plate 102 is higher than that of the lower first porous plate 101, the assist gas is fed upward at a high speed by the respective holes 101a of the first porous plate 101, reaches a low speed by the second porous plate 102, and is broadly diffused. As a result, powder can be efficiently conveyed without piling in the inclination part 112.

In addition, in the above-described Example, the first porous plate and the second porous plate are disposed in the powder discharge line. However, the number of porous plates to be disposed may be three or more without being limited to two. Additionally, although the assist gas chamber is provided below the first porous plate and the assist gas feed device is connected to the lower section of the assist gas chamber, the assist gas feed device may be connected to the end of the assist gas chamber, for example, the base end side of the powder discharge line.

Additionally, although a case where the powder conveyance device related to the invention is applied to the char recovery apparatus in the integrated coal gasification combined cycle has been described in the above-described example, the invention can also be applied to arbitrary devices which convey powder in apparatuses which are not involved in the pulverized coal feed apparatus or the IGCC, without being limited to this char recovery apparatus.

REFERENCE SIGNS LIST

11: COAL FEED APPARATUS
12: COAL GASIFIER
13: CHAR RECOVERY APPARATUS
14: GAS PURIFICATION EQUIPMENT
15: GAS TURBINE EQUIPMENT
16: STEAM TURBINE EQUIPMENT
17: GENERATOR
18: HEAT RECOVERY STEAM GENERATOR
32: CHAR RECOVERY SYSTEM
38: PRODUCT GAS LINE
41: CYCLONE (FIRST DUST COLLECTOR)
42a: FIRST FILTER (SECOND DUST COLLECTOR)
42b: SECOND FILTER (SECOND DUST COLLECTOR)
43a, 43b: ROTARY VALVE
44: BIN
45a, 45b, 45c, 45D: HOPPER
46: FIRST GAS DISCHARGE LINE
47: FIRST CHAR DISCHARGE LINE (FIRST UNBURNED COAL DISCHARGE LINE)
48: SECOND GAS DISCHARGE LINE
49a, 49b: SECOND CHAR DISCHARGE LINE (POWDER DISCHARGE LINE, SECOND UNBURNED COAL DISCHARGE LINE)

101: FIRST POROUS PLATE
102: SECOND POROUS PLATE
103: ASSIST GAS FEED DEVICE
111: LINEAR PART
112: INCLINATION PART
113: LINEAR PART
121: ASSIST GAS CHAMBER
131: FIRST ASSIST GAS FEED PIPE
141: SECOND ASSIST GAS FEED PIPE

The invention claimed is:

1. A powder conveyance device comprising:
a powder discharge line capable of conveying powder at a predetermined tilt angle by allowing char to fall by gravity;
a first porous plate which has a predetermined opening ratio and is disposed along the powder discharge line;
a second porous plate which has a higher opening ratio than the first porous plate and is disposed along the powder discharge line above the first porous plate;
an assist gas feed device which is provided below the first porous plate and feeds a first assist gas to the powder discharge line through a first path through the first porous plate and the second porous plate;
a powder feed line capable of feeding powder which is connected to a base end of the powder discharge line, wherein the first porous plate, the second porous plate, and the assist gas feed device are disposed at least at a connection section of the powder feed line in the powder discharge line; and
an assist gas feed pipe capable of feeding a second assist gas from the powder feed line at an oblique angle with respect to the second porous plate such that the second assist gas is directed at an upper surface of the second porous plate, wherein the assist gas feed pipe feeds the second assist gas through a second path that is different from the first path through the first porous plate and the second porous plate.

2. The powder conveyance device according to claim 1, wherein the first porous plate and the second porous plate are disposed in contact with each other.

3. The powder conveyance device according to claim 1, wherein the powder discharge line has piping which forms a tube shape, the first porous plate and the second porous plate are disposed inside the piping, and an assist gas chamber which constitutes the assist gas feed device is provided below the first porous plate and the second porous plate inside the piping.

4. The powder conveyance device according to claim 1, wherein
a support gas feed pipe capable of feeding a third assist gas toward the connection section of the powder feed line in the powder discharge line, wherein the support assist gas feed pipe feeds the third assist gas through a third path that is different from the first path through the first porous plate and the second porous plate.

5. The powder conveyance device according to claim 1, wherein the assist gas feed pipe intermittently feeds the assist gas.

6. The powder conveyance device according to claim 1, wherein the assist gas feed pipe has a gas feed nozzle which forms a conical shape.

7. A char recovery apparatus which collects an unburned coal from a product gas produced by gasifying solid fuel, the char recovery apparatus comprising:
a first dust collector that is coupled to a product gas line for the product gas;
a second dust collector that is coupled to a first gas discharge line in the first dust collector;
a bin that is coupled to a first unburned coal discharge line in the first dust collector and a second unburned coal discharge line in the second dust collector;
an unburned coal recovery system which returns the unburned coal from the bin;
a first porous plate which has a predetermined opening ratio and is disposed along at least one of the first unburned coal discharge line and the second unburned coal discharge line;
a second porous plate which has a higher opening ratio than the first porous plate and is disposed along the at least one of the first unburned coal discharge line and the second unburned coal discharge line above the first porous plate;
an assist gas feed device which is provided below the first porous plate and feeds a first assist gas to the at least one of the first unburned coal discharge line and the second unburned coal discharge line through a first path through the first porous plate and the second porous plate;
a powder feed line capable of feeding powder which is connected to a base end of the at least one of the first unburned coal discharge line and the second unburned coal discharge line, wherein the first porous plate, the second porous plate, and the assist gas feed device are disposed at least at a connection section of the powder feed line in the at least one of the first unburned coal discharge line and the second unburned coal discharge line; and
an assist gas feed pipe capable of feeding a second assist gas from the powder feed line at an oblique angle with respect to the second porous plate such that the second assist gas is directed at an upper surface of the second porous plate, wherein the assist gas feed pipe feeds the second assist gas through a second path which is different from the first path through the first porous plate and the second porous plate.

* * * * *